United States Patent
Kwon (10) Patent No.: US 10,310,622 B2
(45) Date of Patent: Jun. 4, 2019

(54) METHOD AND DEVICE FOR CORRECTING MOTION INFORMATION COLLECTED BY NUI DEVICE

(71) Applicant: STARSHIP VENDING-MACHINE CORP., Seoul (KR)

(72) Inventor: Ji-yong Kwon, Seoul (KR)

(73) Assignee: STARSHIP VENDING-MACHINE CORP., Seoul (KR)

( * ) Notice: Subject to any disclaimer, the term of this patent is extended or adjusted under 35 U.S.C. 154(b) by 0 days.

(21) Appl. No.: 15/425,049

(22) Filed: Feb. 6, 2017

(65) Prior Publication Data

US 2017/0147081 A1 May 25, 2017

Related U.S. Application Data

(63) Continuation of application No. PCT/KR2015/006477, filed on Jun. 25, 2015.

(30) Foreign Application Priority Data

Aug. 6, 2014 (KR) .................. 10-2014-0100914

(51) Int. Cl.
*G06K 9/00* (2006.01)
*G06F 3/01* (2006.01)
(Continued)

(52) U.S. Cl.
CPC ............ *G06F 3/017* (2013.01); *G06T 5/20* (2013.01); *G06T 7/20* (2013.01);
(Continued)

(58) Field of Classification Search
CPC .......... G06T 13/40; G06T 2207/30196; G06T 7/251; G06T 2207/10016;
(Continued)

(56) References Cited

U.S. PATENT DOCUMENTS 7,257,237 B1 * 8/2007 Luck ................ A61B 5/1113
382/103
8,659,594 B2 * 2/2014 Kim ...................... G06T 13/40
345/419
(Continued)

FOREIGN PATENT DOCUMENTS

JP 2012-083955 A 4/2012
JP 2012-208536 A 10/2012
(Continued)

OTHER PUBLICATIONS

Zhu, Rong, and Zhaoying Zhou. "A real-time articulated human motion tracking using tri-axis inertial/magnetic sensors package." IEEE Transactions on Neural systems and rehabilitation engineering 12.2 (2004): 295-302.*
(Continued)

*Primary Examiner* — Li Liu
(74) *Attorney, Agent, or Firm* — KORUS Patent, LLC; Seong Il Jeong (57) ABSTRACT

The present invention provides a method for stabilizing an instable estimated rotation angle included in motion information generated from a plurality of image frames captured by an NUI device and correcting motion information for a fast speed motion lost during a process of stabilization based on the captured plurality of image frames. Accordingly, an instable motion among motions restored based on motion information can be stabilized, and the accuracy of the motion can be maintained.

14 Claims, 2 Drawing Sheets

(51) Int. Cl.
*G06T 7/20* (2017.01)
*G06T 5/20* (2006.01)

(52) U.S. Cl.
CPC .............. *G06T 2207/10016* (2013.01); *G06T 2207/10028* (2013.01); *G06T 2207/20024* (2013.01); *G06T 2207/20201* (2013.01); *G06T 2207/30196* (2013.01)

(58) Field of Classification Search
CPC ... G06T 2207/20024; G06T 2219/2016; G06T 7/20; G06T 7/73; G06K 9/00342; G06K 9/00201; G06K 9/00355; G06K 9/00362; G06K 9/52; G06K 9/6215
See application file for complete search history.

(56) References Cited

U.S. PATENT DOCUMENTS

| | | | | |
|---|---|---|---|---|
| 2008/0031512 | A1* | 2/2008 | Mundermann | G06K 9/00342 382/154 |
| 2009/0220124 | A1* | 9/2009 | Siegel | G06K 9/00342 382/103 |
| 2011/0298827 | A1* | 12/2011 | Perez | G06K 9/00355 345/647 |
| 2013/0222565 | A1* | 8/2013 | Guerin | A61B 5/744 348/77 |
| 2013/0251244 | A1* | 9/2013 | Wei | G06K 9/00281 382/159 |
| 2013/0307850 | A1* | 11/2013 | Mukai | G06T 13/40 345/420 |
| 2015/0161445 | A1* | 6/2015 | Kim | G06K 9/00342 382/103 |

FOREIGN PATENT DOCUMENTS

| | | |
|---|---|---|
| JP | 2012-208548 A | 10/2012 |
| KR | 10-2004-0055310 A | 6/2004 |
| KR | 10-2010-0025048 A | 3/2010 |
| KR | 10-2011-0070058 A | 6/2011 |
| KR | 10-2013-0095885 A | 8/2013 |

OTHER PUBLICATIONS

Lien, Cheng-Chang, and Chung-Lin Huang. "Model-based articulated hand motion tracking for gesture recognition." Image and Vision computing 16.2 (1998): 121-134.*

Sminchisescu, Cristian, and Bill Triggs. "Kinematic jump processes for monocular 3D human tracking." Computer Vision and Pattern Recognition, 2003. Proceedings. 2003 IEEE Computer Society Conference on. vol. 1. IEEE, 2003.*

* cited by examiner

METHOD AND DEVICE FOR CORRECTING MOTION INFORMATION COLLECTED BY NUI DEVICE

TECHNICAL FIELD

The present invention relates to a method and device for correcting motion information collected by an NUI device, and more particularly to a method and device that extract motion information, i.e., information about the locations of one or more joints and rotation angles based on a motion of a user, from a plurality of image frames acquired by successively capturing a body of the user by means of a natural user interface (NUI) device and that correct motion information extracted from each of the image frames based on the continuity of the motion of the user over time.

BACKGROUND ART

Recently, various devices capable of performing user input through motions of the user via an NUI device have been developed.

In particular, user interfaces configured to, in a game or smart device, recognize motions of a user and perform specific functions based on the recognized motions have been developed.

In this case, to recognize motions of a user, a motion of a user may be successively captured 30 or more times per second generally via a camera, a motion sensor or the like attached to an NUI device, the location of each joint based on the skeleton of the user may be extracted from the captured image frames, and the rotation angle of the joint estimated based on the extracted location of the joint may be calculated.

In this case, since the estimated rotation angle is estimated based on the location of each joint only for a single image frame, the continuity between the rotation angles of the same joint included in successively captured image frames is not taken into consideration.

Accordingly, a problem arises in that an instable rotation angle occurs among the estimated rotation angles of each joint. To overcome this problem, an instable rotation angle is removed by applying a Gaussian filter.

However, although this method can reduce instable rotation angles, the 3D location of each joint becomes different from the location of the joint, calculated from captured image frames, due to a variation in a rotation angle, and thus problems arise in that motion information regarding a fast speed motion is lost and a foot sliding effect in which a motion of a user restored based on the lost motion information becomes insensitive and loses accuracy occurs.

Accordingly, there is a need for a technology for overcoming the above-described problems.

In connection with this, Korean Patent Application Publication No. 10-2010-0025048 relates to an image analysis method and device for capturing a motion, and is configured to detect a plurality of human body regions by tracking skin colors to track motions of a human body by using images received from at least one image input device and to correct the coordinates of the detected human body regions by using image correction parameters, thereby tracking the motions of the human body regions. However, the technology disclosed in the above Korean patent application publication does not overcome the above-described problems.

Meanwhile, the above-described background technology corresponds to technical information that has been possessed by the present inventor in order to contrive the present invention or that has been acquired in the process of contriving the present invention, and cannot be necessarily viewed as a well-known technology that had been known to the public before the filing of the present invention.

DISCLOSURE

Technical Problem

An object of an embodiment of the present invention is to stabilize an instable rotation angle included in motion information generated via an NUI device.

Furthermore, an object of an embodiment of the present invention is to maintain the accuracy of motion information while stabilizing an instable rotation angle included in the motion information.

Technical Solution

As a technical solution for accomplishing the above objects, according to a first aspect of the present invention, there is provided a method for correcting motion information generated from a plurality of image frames in which a motion of a user has been captured, the method including: (a) generating motion information including the locations of one or more joints, namely the axes of motion based on a motion of a user, and estimated rotation angles, namely the rotation angles of the respective joints calculated based on the locations of the one or more joints; (b) applying a stabilization filter, having a time window within a predetermined range based on time, to the estimated rotation angles included in the motion information; and (c) correcting the estimated rotation angles, to which the stabilization filter has been applied, based on the locations of the joints included in the motion information.

Meanwhile, according to a second aspect of the present invention, there is provided a device for correcting motion information generated from a plurality of image frames in which a motion of a user has been captured, the device including: a motion information generation unit configured to generate motion information including the locations of one or more joints, namely the axes of motion based on a motion of a user, and estimated rotation angles, namely the rotation angles of the respective joints calculated based on the locations of the one or more joints; a motion stabilization unit configured to apply a stabilization filter, having a time window within a predetermined range based on time, to the estimated rotation angles included in the motion information generated by the motion information generation unit; and a motion correction unit configured to correct the estimated rotation angles, to which the stabilization filter has been applied by the motion stabilization unit, based on the locations of the joints included in the motion information.

Advantageous Effects

According to any one of the above-described technical solutions, an embodiment of the present invention can stabilize an instable rotation angle included in motion information generated via an NUI device.

Furthermore, according to any one of the above-described technical solutions, an embodiment of the present invention can maintain the accuracy of motion information while stabilizing an instable rotation angle included in the motion information.

Furthermore, high-quality motion information can be acquired via an NUI device in real time by avoiding problems resulting from the application of Gaussian filtering to a rotation angle.

The advantageous effects that can be acquired by the present invention are not limited to the above-described advantageous effects, and other effects that have not been described will be apparently understood by those having ordinary knowledge in the art, to which the present invention pertains, from the following description.

MODE FOR INVENTION

Embodiments of the present invention will be described in detail below with reference to the accompanying drawings so that those having ordinary knowledge in the art to which the present invention pertains can easily practice the present invention. However, the present invention may be implemented in various different forms, and are not limited to the embodiments described herein. Furthermore, in the drawings, parts unrelated to descriptions are omitted in order to clearly describe the present invention, and similar reference symbols are assigned to similar components throughout the specification.

Throughout the specification, when a part is described as being "connected" to another part, this includes not only a case where they are "directly connected" to each other but also a case where they are "electrically connected" to each other with another element interposed therebetween. Furthermore, when a part is described as "including" a component, this means that another component is not be excluded from the part but may be included in the part, unless particularly described to the contrary.

The present invention will be described in detail below with reference to the accompanying diagrams.

Prior to the following description, the meanings of the terms used in the following description are defined first.

In the present invention, "skeleton data" refers to data representing a joint connection structure in a tree form in and around a specific region of the body of a user. In the present specification, for ease of description, although a pelvis is defined as the highest joint and then skeleton data is constructed, another body region may be defined as the highest joint.

Skeleton data may include the number of joints and the connection relationships between the individual joints based on a motion of a user. The locations of one or more joints may be extracted from image frames based on the skeleton data.

In this case, the number of joints that are passed through to reach a pelvis, i.e., the highest joint, along a directly connected skeleton may be calculated for each of the one or more extracted joints. Based on this, joints located at both ends of a single skeleton may be referred to as a "parent joint" and a "child joint," respectively.

That is, one of two directly connected joints that passes through a smaller number of joints to reach a pelvis is referred to as a "parent joint," and a joint that has a direct connection relationship with the parent joint and that passes through a larger number of joints than the parent joint to reach the pelvis is referred to as a "child joint."

Furthermore, the rotation angle of a joint calculated based on the location of the joint in a single image frame is referred to as an "estimated rotation angle," and the rotation angle of a parent joint determined based on a connection vector connecting the location of the parent joint and the location of a child joint having a connection relationship with the parent joint is referred to as a "tracked rotation angle."

Furthermore, a filter configured to adjust or remove an instable estimated rotation angle depending on whether an estimated rotation angle included in successive image frames is stable is referred to as a "stabilization filter," and a factor adapted to be applied to the estimated rotation angle of a joint included in successive image frames is referred to as a "kernel."

In this case, the range within which the stabilization filter is applied is referred to as "the size of a kernel," and a range in a time axis corresponding to the size of a kernel is referred to as a "time window."

The present invention will be described in detail below with reference to the accompanying diagrams.

Figure 1:
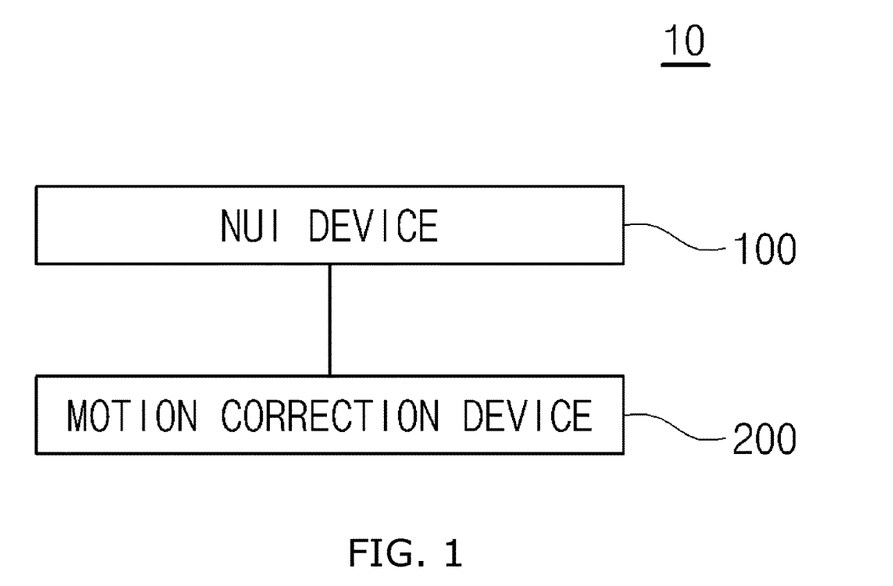
FIG. 1 is a diagram showing the configuration of a system for correcting motion information according to an embodiment of the present invention.

Referring to FIG. 1, a system 10 for correcting motion information according to an embodiment of the present invention includes an NUI device 100 and a motion correction device 200.

The NUI device 100 refers to any device that can recognize a motion, pose or voice of a user by means of at least one of an image sensor, a depth sensor, a motion sensor, and a voice sensor and that can use the recognized information for a command for a software program or an application. Representatives of the NUI device 100 may include a tablet PC, a smartphone, a depth camera, Kinect, etc. on which a touch screen is mounted. The NUI device 100 according to an embodiment of the present invention may be a device that is capable of capturing a motion of a user and transmitting a captured image frame or extracting motion information from the captured image frame, like a depth camera.

The NUI device 100 may generate information including at least one of information about the location of a hand, finger or joint of a user, information about the rotation of the hand, finger or joint of the user, and information about the opening or clenching of the hand of the user by capturing all or part of the body of the user, and may transmit the generated information to the motion correction device 200 via a wired/wireless communication means or transmit a captured image frame to the motion correction device 200.

The motion correction device 200 may receive motion information regarding a plurality of captured image frames from the NUI device 100 via a network N, may apply a stabilization filter to the estimated rotation angle of a joint included in the received motion information, and may correct the estimated rotation angle so that the estimated rotation angle to which the stabilization filter has been applied becomes similar to the location of the joint included in the motion information.

Meanwhile, the motion correction device 200 may perform part of a function that is performed by the NUI device 100. In the following description, for ease of description, a description will be given based on a case where the motion correction device 200 performs at least part of the function that is performed by the NUI device 100.

Figure 2:
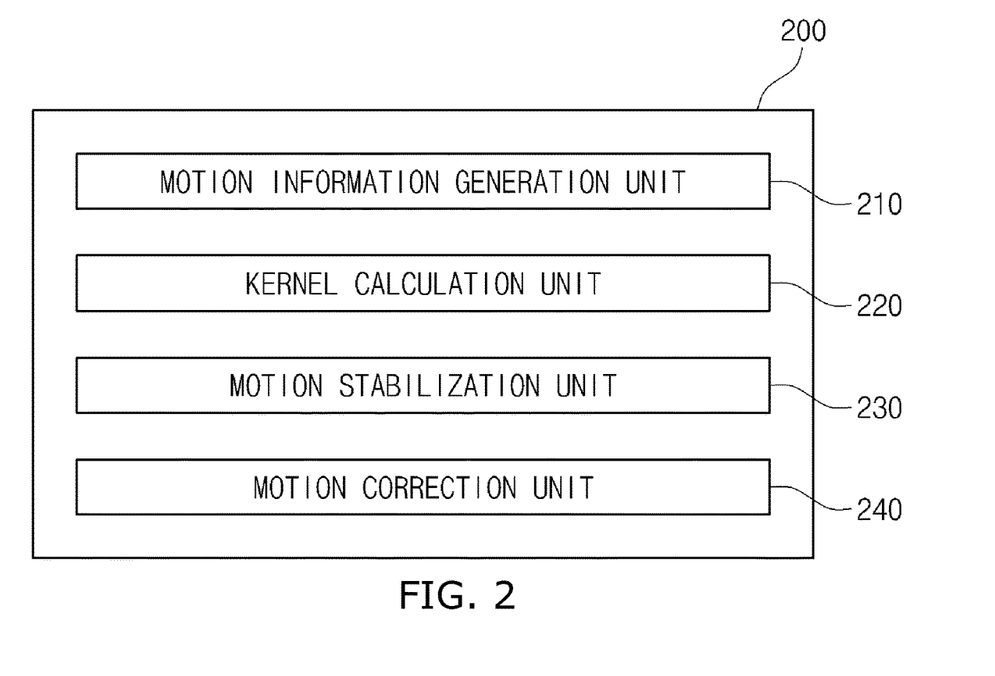
FIG. 2 is a block diagram showing the configuration of a device for correcting motion information according to an embodiment of the present invention.

In the following description, to describe the function of the motion correction device 200, the individual components of the motion correction device 200 will be described with reference to FIG. 2.

First, the motion information generation unit 210 of the motion correction device 200 may determine one or more joints, i.e., the motion axes of a skeleton, based on skeleton data, and may determine the location of each of the joints in the plurality of image frames.

That is, the motion information generation unit 210 may calculate the location of each joint from each of the plurality of image frames, formed by capturing the motion of the user, based on the connection relationships between the joints included in the skeleton data of the user.

Furthermore, the motion information generation unit 210 may calculate the estimated rotation angles of one or more joints based on the locations of the joints included in the plurality of image frames.

In this case, the estimated rotation angles may be represented with, for example, 3D Euler angles or quaternions. However, when the stabilization filter is applied to the estimated rotation angles represented with Euler angles, an error attributable to a singularity phenomenon or a gimbal lock phenomenon occurs frequently, and a stabilization filter for quaternions is preferably applied.

Furthermore, the motion information generation unit 210 may represent the motion information of each of the joints included in the plurality of image frames, as follows:

Definitions $M=\{P_t | t \in [1,T]\}$ (M: motion information)
$P_t=\{p_t^i, q_t^i | i \in J\}$ ($P_t$: still motion at time t)
(i: joint, $p_t^i$: the location of the joint i, $q_t^i$: the estimated rotation angle of the joint i)
$L=\{(i,j) | i \in J, j \in J\}$ (L: the connection relationship between joints, i: parent joint, j: child joint)
$J=[1,N]$ (J: the number of the joint)

In the above-described definitions, motion information may include information about a still motion of the user during a period from time 1 to time T acquired by capturing the motion of the user, the still motion of the user may be represented with a set of the locations of joints and estimated rotation angles, and the location of the joint may be represented in a 3D manner and the estimated rotation angle may be represented in a 4D manner.

Furthermore, the connection relationships between the individual joints may be represented with the relationships between a parent joint and child joints, in which case the joints have joint numbers ranging from 1 to N.

Furthermore, a kernel calculation unit 220 may calculate a kernel the value of which varies depending on the extent of instability of the estimated rotation angle of the same joint for each image frame corresponding to the time window of the stabilization filter in the motion information determined by the motion information generation unit 210.

In this case, to quantify the extent of instability of the estimated rotation angle, basic assumptions are made as follows:

[Assumptions]

1. The rotation of each of individual joints of a skeleton is performed in accordance with a minimal need in response to a motion of a user.
2. The location of a joint included in motion information determined from captured image frames is more accurate than an estimated rotation angle.
3. The rotation angle of a joint does not change rapidly in successive image frames.

The extent of instability may be quantified based on the above-described assumptions.

That is, the kernel calculation unit 220 may calculate a kernel based on the time distance from the reference image frame, to which the stabilization filter is applied, to an adjacent image frame and the difference between a variation in an estimated rotation angle and a variation in a tracked rotation angle in each of the image frames included in the time window in order to calculate the value of the kernel based on the extent of instability of the estimated rotation angle.

More specifically, an equation that is used by the kernel calculation unit 220 in order to calculate the value of the kernel of the stabilization filter is given below:

$$r_s^i = G_k(s-t) G_d(a_s^i - l_s^i) \quad \text{[Equation 1]}$$

In Equation 1, $r_s^i$ refers to the value of the kernel that is to be applied to joint i included in image frame s included in the time window.

In this case, s has the value [t−k,t+k], in which case k is the size of the kernel adapted to determine the range of the time window, and t is the time of a reference image frame to which the stabilization filter is applied.

Furthermore, the kernel calculation unit 220 may calculate a time distance from the reference image frame t to each of one or more image frames s included in a time window set based on the size k of the kernel set by the user in order to determine $G_k(s-t)$ of Equation 1, and may incorporate a correlation with an image frame close to a reference frame to the kernel by applying a Gaussian function to the time distances from the reference image frame t to the image frames s included in the time window.

This is expressed by an equation below:

$$G_k(s-t) = \exp\left(-\frac{0.5(s-t)^2}{k^2}\right) \quad \text{[Equation 2]}$$

The Gaussian function applied to Equation 2 uses t as an average and k as a standard deviation. That is, as the time distance from the reference image frame t to each of the image frame s included in the time window increases, a result value becomes closer to 0, and thus the correlation between the image frames based on the time distance may be incorporated into the kernel.

Furthermore, the kernel calculation unit 220 may calculate a variation in the estimated rotation angle of a joint included in each image frame and a variation in the tracked rotation angle for each of the one or more image frames s included in the time window of the stabilization filter in order to determine $G_d(a_s^i - l_s^i)$ of Equation 1, and may calculate a kernel based on the difference between the calculated variation in the estimated rotation angle and the calculated variation in the tracked rotation angle.

$$G_d(a_s^i - l_s^i) = \exp\left(-\frac{0.5(a_s^i - l_s^i)^2}{d^2}\right) \quad \text{[Equation 3]}$$

That is, referring to Equation 3, when the difference between the variation $a_s^i$ in the estimated rotation angle and the variation $l_s^i$ in the tracked rotation angle for the joint i is significant, it may be determined that the estimated rotation angle is instable information based on the above-described assumption 1 that the rotation of a joint is performed in accordance with a minimal need. Accordingly, the incorporation rate of a stable estimated rotation angle may be increased by decreasing the weight of an instable estimated rotation angle through the application of a Gaussian function, and the instable estimated rotation angle may be removed by calculating a kernel adapted to decrease the incorporation rate of the instable estimated rotation angle.

In this case, the variation $a_s^i$ in the estimated rotation angle may be calculated, as follows:

$$a_s^i = 0.5|\log((q_{s-1}^i)^{-1} q_s^i)| \quad \text{[Equation 4]}$$

That is, in the image frame s, the variation $a_s^i$ in the estimated rotation angle for the joint i is a variation in an estimated rotation angle determined based on the location of the joint determined from an image frame captured as the difference with the estimated rotation $q_{s-1}^i$ angle for the joint i in an image frame s−1 at a previous time.

Furthermore, the variation $l_s^i$ in the tracked rotation angle may be calculated, as follows:

$$l_s^i = \text{angle}(p_s^i - p_s^j, p_{s-1}^i - p_{s-1}^j) \quad \text{[Equation 5]}$$

That is, the variation $l_s^i$ in the tracked rotation angle is a variation in the tracked rotation angle of the parent joint i based on a difference in the rotation angle that is measured in the previous image frame s−1 of the vector $(p_s^i - p_s^j)$, connecting the location of the parent joint i and the location of the child joint j, and the current image frame s.

In other words, the variation $l_s^i$ in the tracked rotation angle refers to the minimum rotation angle of the parent joint i required to represent the location of the tracked child joint j.

A problem that occurs when a conventional Gaussian kernel having a predetermined kernel is applied may be compensated for by adaptively calculating the kernel of the stabilization filter based on Equations 1 to 5 depending on whether the estimated rotation angle in the image frame included in the time window is stabile.

Furthermore, the stabilization filter is applied to the estimated rotation angle of the motion information, and thus the instable estimated rotation angle can be ignored and a new estimated rotation angle can be calculated based on only a stable estimated rotation angle according to the correlations between the individual image frames, thereby acquiring a stable estimated rotation angle.

Meanwhile, the kernel calculation unit 220 may perform a normalization process so that the sum of the values of kernels becomes 1 in order to ensure the accuracy of convolution calculation adapted to apply a stabilization filter to be described later to the estimated rotation angle.

Furthermore, a motion stabilization unit 230 may apply a stabilization filter to the estimated rotation angle of each of one or more joints included in the motion information.

That is, the motion stabilization unit 230 may stabilize the estimated rotation angle, for which a variation in the estimated rotation angle exceeds a predetermined range, for each joint by applying the kernel of the stabilization filter to the motion information.

For example, the motion stabilization unit 230 may stabilize the instable estimated rotation angle by performing convolution calculation between the value of the kernel of the stabilization filter, calculated so that a part the estimated rotation angle of which is determined to be instable by the kernel calculation unit 220 has a small weight and a part the estimated rotation angle of which is determined to be stable has a large weight, and the estimated rotation angle in each of the plurality of image frames based on each of the one or more joints.

This is expressed by an equation, as follows:

$$Q_t^i = \{q_{t-k}^i, q_{t-k+1}^i, \ldots, q_{t+k-1}^i, q_{t+k}^i\}$$

$$R_t^i = \{r_{t-k}^i, r_{t-k+1}^i, \ldots, r_{t+k-1}^i, r_{t+k}^i\}$$

$$\hat{q}_t^i = R_t^i \oplus Q_t^i \quad \text{[Equation 6]}$$

($Q_t^i$: sequence, $R_t^i$: kernel, $r_{t-k}^i$: kernel value, $q_t^i$: estimated rotation angle, and $\hat{q}_t^i$: stabilized estimated rotation angle)

In this case, the kernel of the stabilization filter may include a kernel value to be applied to each of the image frames included in the time window calculated via Equations 1 to 5 by the kernel calculation unit 220, and the estimated rotation angle sequence of the joint may include the estimated rotation angles of the joints in the individual image frames within the time window range based on the reference image frame.

Furthermore, the stabilized estimated rotation angle is an estimated rotation angle in which the kernel of the stabilization filter has been applied to an estimated rotation angle sequence of the joint via a convolution calculation method.

In this case, to ensure that the estimated rotation angle and the stabilized estimated rotation angle, included in the motion information, is always represented with a unit quaternion, convolution calculation may be performed by performing linearization through the application of a log function to an input quaternion, and an index function may be applied to a result value.

Furthermore, a motion correction unit 240 may correct the motion information of each of one or more joints to which the stabilization filter calculated by the kernel calculation unit 220 has been applied in the motion stabilization unit 230.

That is, the motion correction unit 240 may determine each of the locations of the one or more joints based on the estimated rotation angle of the motion information of each of the one or more joints to which the stabilization filter has been applied, and may correct the estimated rotation angle of each of the one or more joints so that the determined locations of the one or more joints become similar to the locations of the one or more joints based on captured image frames.

In other words, the motion correction unit 240 may determine the locations of the joints based on the estimated rotation angles, to which the stabilization filter has been applied, via static kinematics calculation, and may then correct the estimated rotation angles to which the stabilization filter has been applied so that the determined locations of the joints become similar to the locations of the joints determined from captured image frames.

For example, the motion correction unit 240 may determine the location of a child joint determined based on the estimated rotation angle of a parent joint to which the stabilization filter has been applied for each of the one or more joints, and may then correct the estimated rotation angle of the parent joint, to which the stabilization filter has been applied, so that a connection vector connecting the determined location of the child joint and the determined location of the parent joint becomes consistent with a connection vector connecting the location of the child joint and the location of the parent joint based on the image frames.

That is, a more accurate estimated rotation angle may be calculated by correcting a stabilized estimated rotation angle based on the location of a joint calculated from an image frame under the above-described assumption 2 that the location of a joint calculated from image frames is more accurate than an estimated rotation angle.

Figure 3:
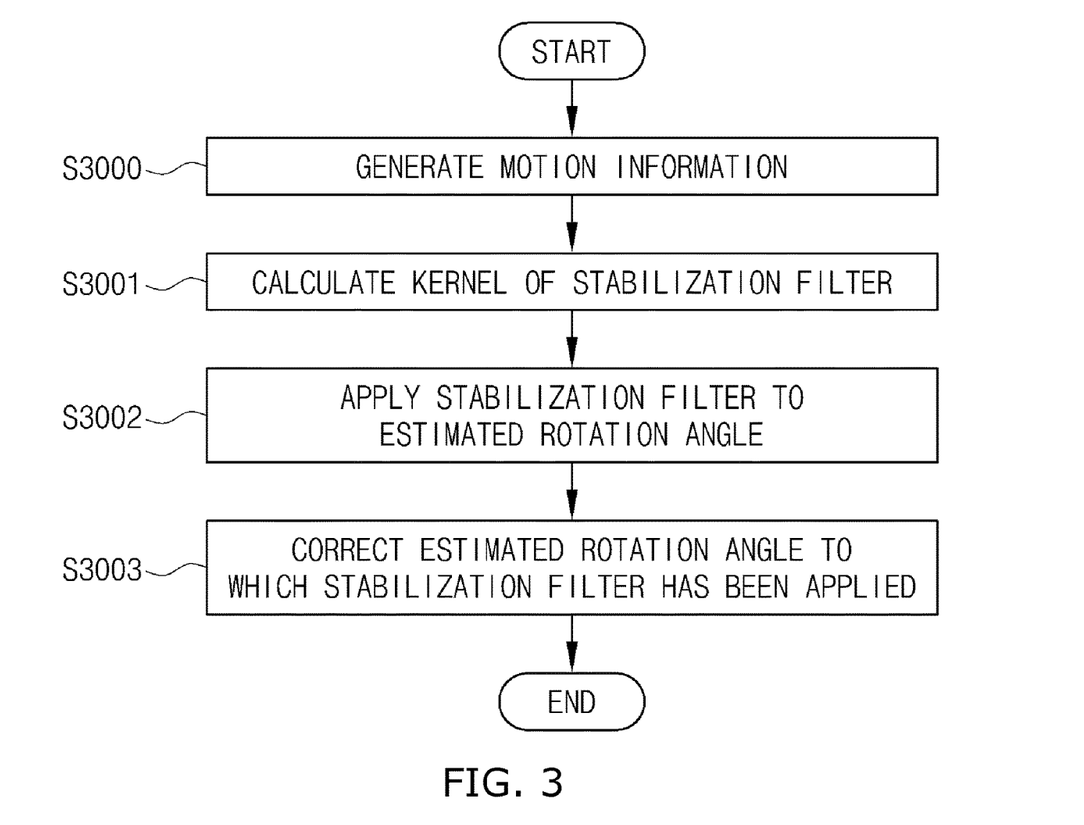
FIG. 3 is a flowchart illustrating a method for correcting motion information according to an embodiment of the present invention.

The method for correcting motion information according to the embodiment shown in FIG. 3 includes steps that are processed by the interface provision device 200, shown in FIG. 3, in a time sequential manner. Accordingly, the items that are omitted below but have been described in conjunction with the interface provision device 200 shown in FIG. 2 may be also applied to the method for correcting motion information according to the embodiment shown in FIG. 3.

First, the motion correction device 200 may generate motion information including the locations of one or more joints, i.e., the axes of motion based on a motion of a user, from a plurality of image frames in which the motion of the user has been captured, and the estimated rotation angles of respective joints calculated based on the locations of the one or more joints at step S3000.

Prior to this step, the NUI device 100 may capture a motion of the user in predetermined time intervals, and the motion correction device 200 may receive a plurality of captured image frames from the NUI device 10, may derive the skeleton data of the user based on the plurality of received image frames, and may determine one or more joints of a skeleton based on the derived skeleton data.

Furthermore, the motion correction device 200 may determine the 3D location of each of the joints determined in each of the image frames, and may calculate the estimated rotation angle of the joint based on the 3D location of the joint.

That is, the motion correction device 200 may calculate the estimated rotation angle based on the location of the joint based on a single image frame in which a still motion of the user has been captured at a specific time.

Accordingly, the estimated rotation angle is calculated based on the location of the joint without considering the continuity of a motion, and thus a case where one or more of estimated rotation angles in a plurality of image frames exceed a predetermined range of variations in the estimated rotation angle may occur.

To remove such an instable estimated rotation angle, the motion correction device 200 may calculate the kernel of a stabilization filter having a time window within a predetermined range based on time at step S3001.

That is, to calculate the kernel of the stabilization filter having the time window, the motion correction device 200 may receive the size of the kernel from the user, or may determine the time window based on the set size of the kernel.

Furthermore, the motion correction device 200 may calculate the kernel of the stabilization filter based on a time distance between a reference image frame to which the stabilization filter has been applied and each of one or more image frames included in the time window and also based on an estimated rotation angle and a tracked rotation angle for each of one or more joints included in each image frame.

That is, to calculate the kernel of the stabilization filter, the motion correction device 200 may calculate a time distance, i.e., a difference in time between, for example, a reference frame to which the stabilization filter is applied and a single image frame included in the time window from, and may calculate the difference between a variation in an estimated rotation angle and a variation in an tracked rotation angle for each of one or more joints in each image frame included in the time window.

In this case, the motion correction device 200 may calculate a variation in the estimated rotation angle by calculating the difference between an estimated rotation angle in the past image frame of an image frame, in which the time distance with a reference image frame is calculated, and an estimated rotation angle in a current image frame.

Furthermore, the motion correction device 200 may calculate a tracked rotation angle based on a vector connecting a joint for which a tracked rotation angle is obtained and the location of a child joint having a connection relationship with a parent joint based on the connection relationships between the joints, and a variation in the tracked rotation angle may be calculated by calculating the difference between a tracked rotation angle in a past image frame of an image frame, for which a time distance with a reference image frame is calculated, and a tracked rotation angle in a current image frame.

Thereafter, the motion correction device 200 may calculate the difference between the calculated variation in the estimated rotation angle and the calculated variation in the tracked rotation angle, and may calculate the kernel based on the time distance and the difference between the variation in the estimated rotation angle and the variation in the tracked rotation angle.

For example, the motion correction device 200 may apply a Gaussian function to each of the time distance and the difference between the variation in the estimated rotation angle and the variation in the tracked rotation angle, through which the kernel of the stabilization filter, into which a weight based on the time distance and the extent of instability of the estimated rotation angle based on the variation in the estimated rotation angle and the variation in the tracked rotation angle have been incorporated, may be calculated.

Furthermore, at step S3002, the motion correction device 200 may apply the stabilization filter, calculated at step S3001, to the estimated rotation angle of the motion information generated at step S3000.

That is, the motion correction device 200 may apply the stabilization filter to, for example, an estimated rotation angle in a plurality of frames for each joint through convolution calculation.

The estimated rotation angle in the reference image frame is calculated by using a weight varying depending on whether the estimated rotation angle included in the time window is stable by means of the kernel of the stabilization filter adaptively calculated via convolution calculation depending on whether the estimated rotation angle is instable, and thus an instable estimated rotation angle can be removed.

After the stabilization filter has been applied to the estimated rotation angle in the plurality of image frames for each of all the joints as described above, the motion correction device 200 may correct the estimated rotation angle to which the stabilization filter has been applied at step S3003.

That is, the motion correction device 200 may correct the estimated rotation angle by comparing the estimated rotation angle, to which the stabilization filter has been applied, with the location of the joint calculated from the image frames.

For this purpose, the motion correction device 200 may calculate the location of the joint corresponding to the estimated rotation angle, for example, via static kinematics calculation based on the estimated rotation angle to which the stabilization filter has been applied, and may correct the estimated rotation angle to which the stabilization filter has been applied so that the calculated location of the joint becomes consistent with the location of the joint calculated from the image frames.

Through the above-described correction of the estimated rotation angle, the accuracy of the motion information from which the instable rotation angle has been removed can be maintained.

The method for correcting motion information according to the embodiment described via FIG. 3 may be also implemented in the form of a storage medium including computer-executable instructions, such as a program module executed by a computer. A computer-readable medium may be any available medium accessible to a computer, and includes all volatile and non-volatile media and separable and non-separable media. Furthermore, the computer-readable medium may include both a computer storage medium and a communication medium. The computer storage medium includes all volatile and non-volatile media and separable and non-separable media implemented using any method or technique for storing information, such as computer-readable instructions, data structures, program modules, and other data. The communication medium typically includes computer-readable instructions, data structures, program modules, other data of a modulated data signal, such as carriers, or other transmission mechanisms, and also includes any information transfer media.

Furthermore, the method according to an embodiment of the present invention may be implemented using a computer program (or a computer program product) including a computer-executable instructions. The computer program includes programmable machine instructions processed by a processor, and may be implemented using a high-level programming language, an object-oriented programming language, an assembly language, or a machine language. Furthermore, the computer program may be recorded on a variety of types of computer-readable storage media (e.g., memory, a hard disk, a magnetic/optical medium, or a solid-state drive (SSD)).

Accordingly, the method according to an embodiment of the present invention may be implemented when a computer program, such as that described above, is executed by a computing device. The computing device may include at least some of a processor, memory, a storage device, a high-speed interface connected to the memory and a high-speed extension port, and a low-speed interface connected to a low-speed bus and the storage device. These components are interconnected using various buses, and may be mounted on a common motherboard or may be mounted using other appropriate methods.

In this case, the processor may process instructions within the computing device. The instructions may be, for example, instructions stored in memory or a storage device in order to display graphic information adapted to provide a graphic user interface (GUI) on an external input/output device, such as a display connected to a high-speed interface. As another embodiment, a plurality of processors and/or a plurality of buses may be appropriately used along with a plurality of pieces of memory and a plurality of memory forms. Furthermore, the processor may be implemented using a chipset formed by chips that include a plurality of analog and/or digital processors.

Furthermore, the memory stores information within the computing device. As an example, the memory may include a volatile memory unit or a set of volatile memory units. As another example, the memory may include a non-volatile memory unit or a set of non-volatile memory units. Furthermore, the memory may be another type of computer-readable medium, such as a magnetic or optical disk.

Furthermore, the storage device may provide a large storage space to the computing device. The storage device may be a computer-readable medium, or may be a component including the computer-readable medium. For example, the storage device may also include devices within a storage area network (SAN) or other components, and may be a floppy disk device, a hard disk device, an optical disk device, a tape device, flash memory, or a similar semiconductor memory device or device array.

The above detailed description of the present invention is merely for an illustrative purpose. It will be understood that those having ordinary knowledge in the art to which the present invention pertains can easily make modifications and variations without departing from the technical spirit and essential features of the present invention. Therefore, the above-described embodiments are illustrative in all aspects, and are not limitative. For example, each component described as being in a single form may be practiced in a distributed form. In the same manner, components described as being in a distributed form may be practiced in an integrated form.

The scope of the present invention is defined by the attached claims, rather than the detailed description. Furthermore, all modifications and variations derived from the meanings, scope and equivalents of the claims should be construed as falling within the scope of the present invention.

What is claimed is:

1. A method for correcting motion information generated from a plurality of image frames in which a motion of a user has been captured, the method comprising:
   (a) generating motion information including locations of one or more joints, namely axes of motion based on a motion of a user, and estimated rotation angles, namely rotation angles of the respective joints calculated based on the locations of the one or more joints;
   (b) applying a stabilization filter, having a time window within a predetermined range based on time, to the estimated rotation angles included in the motion information; and
   (c) correcting the estimated rotation angles, to which the stabilization filter has been applied, based on the locations of the joints included in the motion information;
   wherein step (b) comprises removing an estimated rotation angle, for which a variation in an estimated rotation angle exceeds a predetermined range between the plurality of image frames, from the estimated rotation angles of the one or more joints included in the motion information; and
   wherein removing the estimated rotation angle comprises:
   calculating a kernel of the stabilization filter to be applied to the estimated rotation angles included in the motion information; and
   applying the stabilization filter having the calculated kernel to the joints of the plurality of image frames.

2. The method of claim 1, wherein calculating the kernel of the stabilization filter comprises calculating the kernel of the stabilization filter based on time distances between a reference image frame to which the stabilization filter is applied and the image frames included in the time window and estimated rotation angles and tracked rotation angles of the joints in the image frames included in the time window.

3. The method of claim 2, wherein calculating the kernel of the stabilization filter comprises:
  calculating differences in time between the reference frame to which the stabilization filter is applied and the image frames included in the time window; and
  calculating a difference between a variation in an estimated rotation angle and an variation in an tracked rotation angle for each of the joints in the image frames included in the time window.

4. The method of claim 3, wherein calculating the difference between the variation in the estimated rotation angle and the variation in the tracked rotation angle comprises:
  calculating the variation in the estimated rotation angle of the joint between successive image frames included in the time window;
  calculating a tracked rotation angle based on a connection vector connecting a location of the joint and a location of a child joint having a connection relationship with the joint; and
  calculating the variation in the tracked rotation angle of the joint in the successive image frames included in the time window.

5. The method of claim 1, wherein step (c) comprises:
  calculating the locations of the joints based on the estimated rotation angles of the joints to which the stabilization filter has been applied; and
  correcting the estimated rotation angles of the joints to which the stabilization filter has been applied so that the calculated locations of the joints become similar to the locations of the joints in the image frames.

6. The method of claim 5, wherein calculating the locations of the joints comprises:
  calculating a location of a child joint determined based on an estimated rotation angle of a parent joint, namely any one of the joints to which the stabilization filter has been applied; and
  correcting the estimated rotation angle of the parent joint to which the stabilization filter has been applied so that a connection vector connecting the calculated location of the child joint and the location of the parent joint becomes consistent with a connection vector connecting a location of the child joint and a location of the parent joint in the image frames.

7. A device for correcting motion information generated from a plurality of image frames in which a motion of a user has been captured, the device comprising:
  a processor configured to:
  generate motion information including locations of one or more joints, namely axes of motion based on a motion of a user, and estimated rotation angles, namely rotation angles of the respective joints calculated based on the locations of the one or more joints;
  calculate a kernel of a stabilization filter to be applied to the estimated rotation angles included in the motion information;
  apply the stabilization filter, having a time window within a predetermined range based on time, to the estimated rotation angles included in the motion information; and
  correct the estimated rotation angles, to which the stabilization filter has been applied by the processor, based on the locations of the joints included in the motion information;
  wherein the processor:
  removes an estimated rotation angle, for which a variation in an estimated rotation angle exceeds a predetermined range between the plurality of image frames, from the estimated rotation angles of the one or more joints included in the motion information; and
  applies the stabilization filter having the calculated kernel to the joints of the plurality of image frames.

8. The device of claim 7, wherein the processor calculates the kernel of the stabilization filter based on time distances between a reference image frame to which the stabilization filter is applied and the image frames included in the time window and estimated rotation angles and tracked rotation angles of the joints in the image frames included in the time window.

9. The device of claim 8, wherein the processor:
  calculates differences in time between the reference frame to which the stabilization filter is applied and the image frames included in the time window; and
  calculates a difference between a variation in an estimated rotation angle and an variation in an tracked rotation angle for each of the joints in the image frames included in the time window.

10. The device of claim 9, wherein the processor:
  calculates the variation in the estimated rotation angle of the joint between successive image frames included in the time window, calculates a tracked rotation angle based on a connection vector connecting a location of the joint and a location of a child joint having a connection relationship with the joint, and calculates the variation in the tracked rotation angle of the joint in the successive image frames included in the time window.

11. The device of claim 7, wherein the processor:
  calculates the locations of the joints based on the estimated rotation angles of the joints to which the stabilization filter has been applied, and corrects the estimated rotation angles of the joints to which the stabilization filter has been applied so that the calculated locations of the joints become similar to the locations of the joints in the image frames.

12. The device of claim 11, wherein the processor:
  calculates a location of a child joint determined based on an estimated rotation angle of a parent joint, namely any one of the joints to which the stabilization filter has been applied, and corrects the estimated rotation angle of the parent joint to which the stabilization filter has been applied so that a connection vector connecting the calculated location of the child joint and the location of the parent joint becomes consistent with a connection vector connecting a location of the child joint and a location of the parent joint in the image frames.

13. A non-transitory computer-readable storage medium having stored thereon a program for performing the method set forth in claim 1.

14. A computer program stored in a non-transitory medium to perform the method set forth in claim 1.

* * * * *